US012608249B2

(12) United States Patent
Wachowicz

(10) Patent No.: US 12,608,249 B2
(45) Date of Patent: Apr. 21, 2026

(54) OPTIMIZING INTERMEDIATE OUTPUT ACCUMULATION OF PARALLEL PROCESSING OPERATIONS IN STREAMING AND LATENCY-SENSITIVE APPLICATIONS

(71) Applicant: NVIDIA Corporation, Santa Clara, CA (US)

(72) Inventor: Dominik Wachowicz, Gdańsk (PL)

(73) Assignee: NVIDIA Corporation, Santa Clara, CA (US)

( * ) Notice: Subject to any disclaimer, the term of this patent is extended or adjusted under 35 U.S.C. 154(b) by 590 days.

(21) Appl. No.: 18/077,942

(22) Filed: Dec. 8, 2022

(65) Prior Publication Data

US 2024/0193017 A1     Jun. 13, 2024

(51) Int. Cl.
*G06F 9/54*          (2006.01)
(52) U.S. Cl.
CPC .................................... *G06F 9/544* (2013.01)
(58) Field of Classification Search
None
See application file for complete search history.

(56) References Cited

U.S. PATENT DOCUMENTS

| | | | | |
|---|---|---|---|---|
| 2007/0073973 A1* | 3/2007 | Hazay | ................... | G06F 12/023 |
| | | | | 711/E12.006 |
| 2013/0335443 A1* | 12/2013 | Harper | ................... | G09G 5/363 |
| | | | | 345/629 |
| 2018/0095750 A1* | 4/2018 | Drysdale | ................... | G06F 9/50 |
| 2019/0005712 A1* | 1/2019 | Nevraev | ................ | G06T 15/60 |
| 2019/0188239 A1* | 6/2019 | Serrano | ................ | G06F 9/3851 |
| 2021/0133917 A1* | 5/2021 | Tu | ............... | G06T 1/20 |
| 2022/0069840 A1* | 3/2022 | Häggebrant | ........ | H03M 7/6017 |
| 2022/0206838 A1* | 6/2022 | Luo | ........................... | G06T 1/60 |

OTHER PUBLICATIONS

Courreges, Adrian "DOOM (2016)—Graphics Study" https://www.adriancourreges.com/blog/2016/09/09/doom-2016-graphics-study/, Sep. 9, 2016.

* cited by examiner

*Primary Examiner* — S. Sough
*Assistant Examiner* — Selena Sabah Nahra
(74) *Attorney, Agent, or Firm* — Lowenstein Sandler LLP

(57)          ABSTRACT
Described are apparatuses, systems, and techniques for efficient parallel execution of multiple processes in real-time streaming and latency-sensitive applications. The techniques include but are not limited to executing in parallel multiple processing threads, storing data output by the multiple processing threads in respective accumulation buffers, and applying an aggregation function to the stored data to generate an aggregated data.

18 Claims, 8 Drawing Sheets

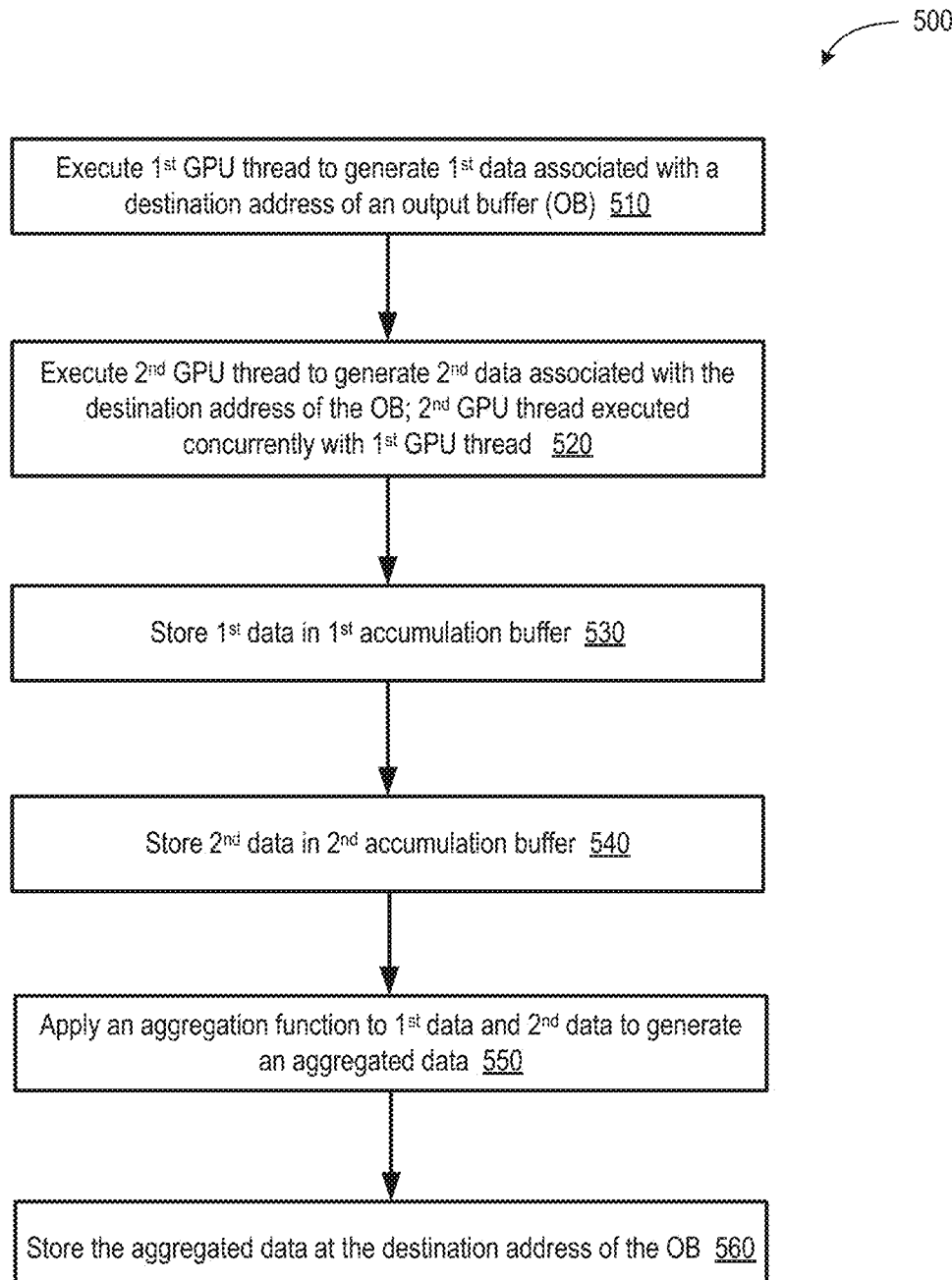

500

Execute 1st GPU thread to generate 1st data associated with a destination address of an output buffer (OB)  510

Execute 2nd GPU thread to generate 2nd data associated with the destination address of the OB; 2nd GPU thread executed concurrently with 1st GPU thread  520

Store 1st data in 1st accumulation buffer  530

Store 2nd data in 2nd accumulation buffer  540

Apply an aggregation function to 1st data and 2nd data to generate an aggregated data  550

Store the aggregated data at the destination address of the OB  560

FIG. 5

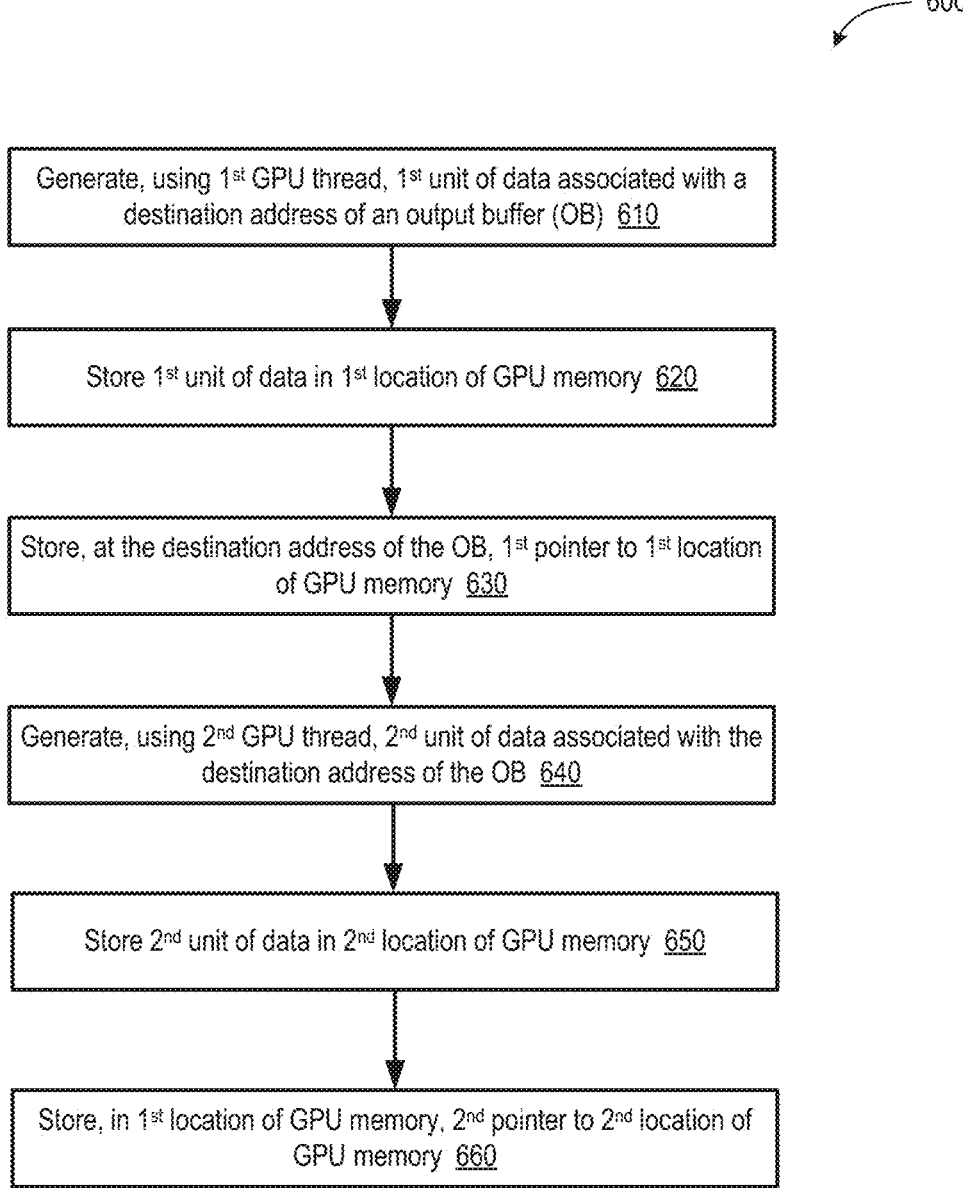

— 600

Generate, using 1st GPU thread, 1st unit of data associated with a destination address of an output buffer (OB)  610

Store 1st unit of data in 1st location of GPU memory  620

Store, at the destination address of the OB, 1st pointer to 1st location of GPU memory  630

Generate, using 2nd GPU thread, 2nd unit of data associated with the destination address of the OB  640

Store 2nd unit of data in 2nd location of GPU memory  650

Store, in 1st location of GPU memory, 2nd pointer to 2nd location of GPU memory  660

FIG. 6

OPTIMIZING INTERMEDIATE OUTPUT ACCUMULATION OF PARALLEL PROCESSING OPERATIONS IN STREAMING AND LATENCY-SENSITIVE APPLICATIONS

TECHNICAL FIELD

At least one embodiment pertains to processing resources and techniques that are used to improve efficiency and decrease latency of computational operations. For example, at least one embodiment pertains to handling of multiple streams of processed data in latency-sensitive applications, including real-time streaming and gaming applications.

BACKGROUND

Central processing units (CPUs) are capable of efficient execution of serial processing tasks including heavy computational tasks. Modern CPUs typically have multiple (e.g., eight, twelve, etc.) processing cores and are capable of parallelized processing of complex computational tasks. Graphics processing units (GPUs) often have an even larger number of cores (e.g., hundreds of cores) that are capable of massive parallel processing of certain computational tasks. Because of this special architecture, GPUs are uniquely suitable for efficient execution of various applications that have significant industrial importance. For example, GPUs are capable of rendering images (frames) in real time with multiple cores rendering pixel data simultaneously for multiple regions of an image. In another example, GPUs are capable of performing parallelized neuron operations (matrix multiplications) in artificial intelligence applications involving neural networks.

BRIEF DESCRIPTION OF DRAWINGS

FIG. 5 is a flow diagram of an example method of deployment of accumulation buffers for efficient execution of multiple processing operations in real-time streaming and latency-sensitive applications, according to at least one embodiment;

FIG. 6 is a flow diagram of an example method of deployment of pointers and linked nodes for efficient execution of multiple processing operations in real-time streaming and latency-sensitive applications, according to at least one embodiment;

DETAILED DESCRIPTION

Applications executed on GPUs, including but not limited to graphics applications, often perform a large number of computational operations, each operation contributing its individual output to the overall computational output of the application. For example, a gaming application may render a single image using, e.g., a first operation that renders a first object in a foreground, a second operation that renders a second object in the foreground, a third operation that renders a background (or a portion of the background), a fourth operation that generates a soundtrack for the image, and so on. Complex gaming scenes may involve tens or even hundreds of such operations. Operations are often managed by a CPU, which receives calls for execution of those operations from the application via an application programming interface (API). The CPU can execute a number of dispatch functions (DFs) created in response to the received calls. Each DF may cause an execution, on a GPU, of a respective GPU thread that generates and stores output data in an output buffer (OB) of the GPU, which may reside in any portion of GPU cache or internal ("local") memory. In some instances, outputs of multiple DFs may be directed to the same OB memory address. For example, when the outputs are intended to be displayed on a computer screen, different DFs may render depictions of different objects having a certain degree of opacity and intended to be displayed as overlaid objects within the same region of the computer screen. Accordingly, outputs of multiple DFs may have to be merged to produce the final aggregated output using a suitable merge (aggregation) function. To produce the correct aggregated output, the merge function may have to operate on various DF outputs in a certain order (e.g., in order to keep track of the depths at which different objects are to be displayed).

Figure 3A:
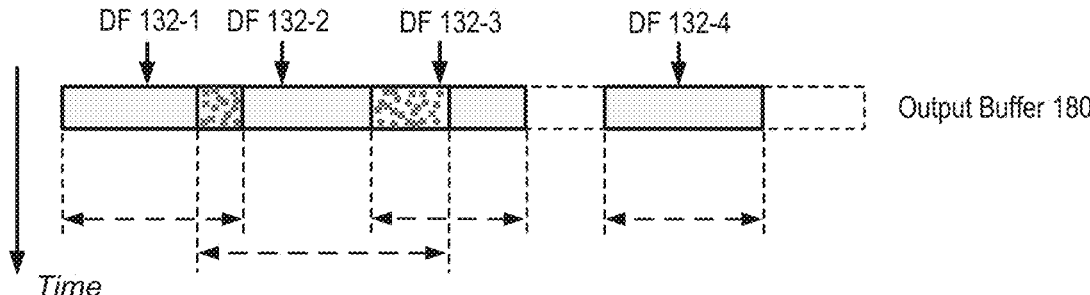
FIGS. 3A-3D illustrate schematically deployment of accumulation buffers for execution of multiple processing operations in real-time streaming and latency-sensitive applications, according to at least one embodiment.

An out-of-order arrival of DF outputs may result in incorrectly merged aggregated outputs stored in those portions of the OB that receive the out-of-order DF outputs (as illustrated schematically in FIG. 3A with the spotted portion of the OB). Conventional techniques ensure the correct order of DF outputs by executing different DFs/GPU threads sequentially. For example, the API or a GPU driver may establish temporal barriers between separate DFs. To avoid the output data arriving in GPU memory out of order, the barriers may force the GPU to begin execution of each subsequent DF after the previous DF has been fully executed and the output data from the previous DF has been stored in the OB or merged with the data previously stored in the OB (as illustrated schematically in FIG. 3B). Such sequential processing detrimentally affects GPU utilization and increases processing times and latency of GPU-executed applications even though the GPU is capable of handling multiple DFs in parallel.

Aspects and embodiments of the instant disclosure address these and other technological challenges by disclosing methods and systems that facilitate efficient parallel processing and combining of individual processing outputs in a correct order. Although, for the sake of concreteness, the disclosed embodiments are illustrated with references to GPUs, similar techniques may be used with any other processing devices capable of parallel execution of multiple operations that produce ordered outputs. In some embodiments, an additional set of buffers (referred to as accumulation buffers herein) may be established, each buffer being assigned to a respective DF. Various DFs may be executed using parallel GPU threads with the outputs of separate DFs stored in separate accumulation buffers. At the completion of parallel processing, an additional DF (e.g., an aggregation DF) may cause the GPU to execute a merge function (MF) to generate an aggregated output in view of the correct order of the DF outputs retrieved from the corresponding accumulation buffers (as illustrated schematically in FIG. 3C).

The accumulation buffers may be established (e.g., by the GPU driver, the API, and/or any combination thereof) in any suitable memory device. For example, for increased speed of data storage and copying, the accumulation buffers may be located in an internal GPU memory. In some embodiments, at the initialization of the application, the API may define offsets that determine the start and the end of the memory addresses of the GPU memory allocated to each accumulation buffer. In some embodiments, accumulation buffers may have custom sizes that are defined based on the sizes of the maximum expected outputs of the respective DFs.

In some embodiments, the output data may be stored using linked lists. More specifically, rather than hosting the output data directly, the OB may store pointers to memory addresses in the GPU memory where the actual output data is stored. Once a unit of data is generated in the course of GPU execution of a given DF, e.g., an nth DF, the unit of data may be stored in any free memory address (e.g., the next available address or a random free address in the GPU memory) and a pointer to that address may be stored in the OB. When a new unit of data is generated in the course of execution of a different DF, e.g., an mth DF, the new unit of data may also be stored in any available memory address and a pointer to the mth DF data may be added to the GPU memory address storing the nth DF (as illustrated schematically in FIGS. 4A-4B). Each stored unit of data may be stored in association with an identification of the respective DF that generated the data, so that the merge function may read all the units of output data stored in each linked list of pointers/data and determine the correct order of aggregation.

The advantages of the disclosed techniques include, but are not limited to, increased processing speed and reduced latency of execution of applications that involve multiple tasks on various processing devices (e.g., GPUs, CPUs, etc.) capable of carrying out parallel computations. The reduced latency improves speed of data generation and, therefore, enhances quality (and, in some instances, safety) of various streaming and latency-sensitive systems and applications.

The systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

System Architecture

Figure 1:
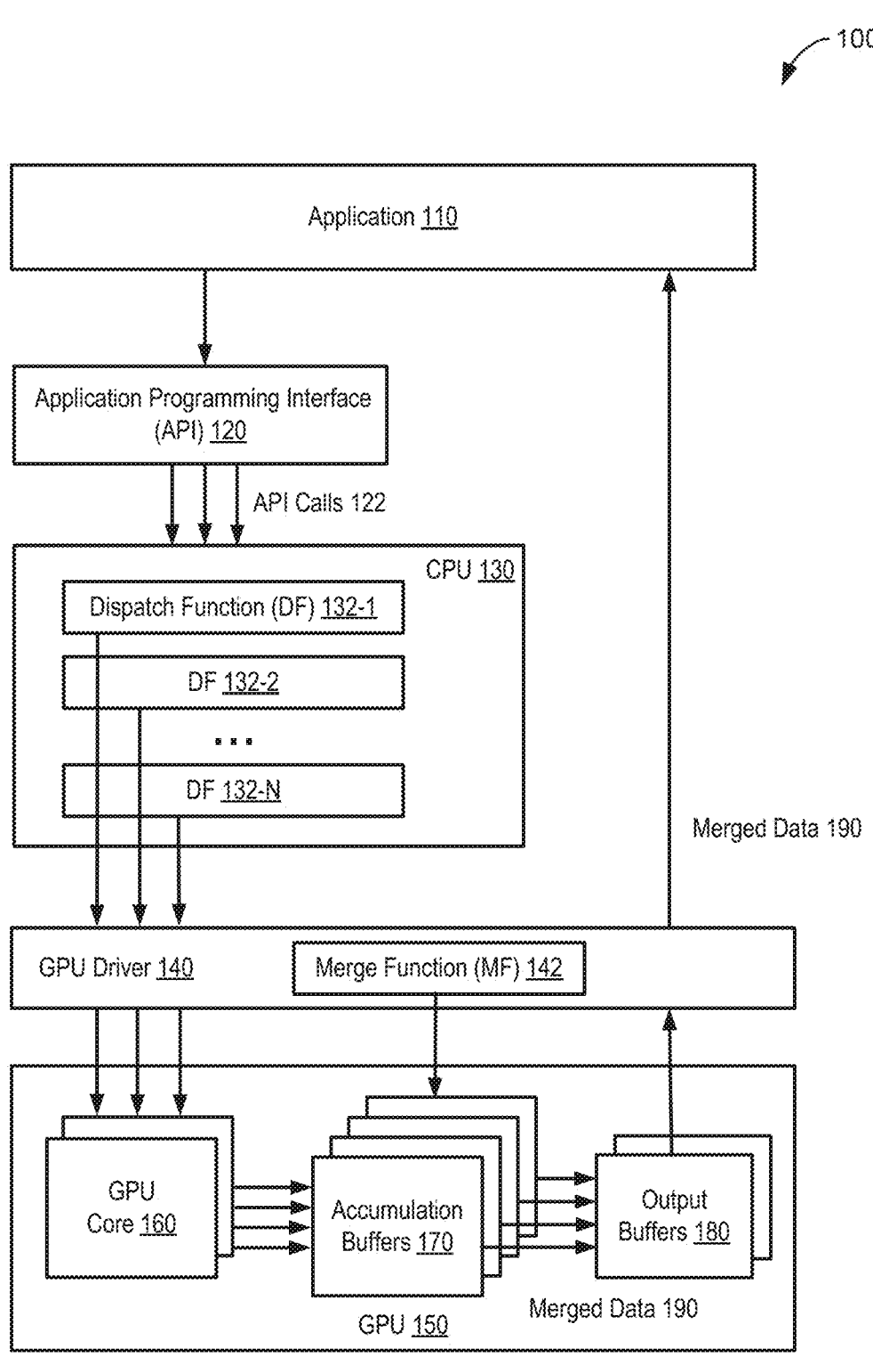
FIG. 1 is a block diagram of an example computer architecture capable of using accumulation buffers for efficient parallel execution of multiple processing operations in real-time streaming and latency-sensitive applications, according to at least one embodiment.

FIG. 1 is a block diagram of an example computer architecture 100 capable of using accumulation buffers for efficient parallel execution of multiple processing operations in real-time streaming and latency-sensitive applications, according to at least one embodiment. As depicted in FIG. 1, computer architecture 100 may support execution of one or more applications, e.g., an application 110. Application(s) 110 may include video streaming applications, audio streaming applications, virtual and/or augmented reality applications, ray-tracing applications, digital avatar applications, video game applications, robotics applications, public and private security applications, simulation and modeling applications, autonomous driving or driving assist applications, industrial monitoring applications, deep learning and artificial intelligence applications, including deep neural network application, and/or the like. Computer architecture 100 may support concurrent execution of multiple applications 110 of different types and different processing/memory requirements.

Operations of application 110 may be executed using one or more processing devices, e.g., CPU 130, GPU 150, and or any other processing unit(s) capable of parallel execution of multiple instructions and/or threads of instruction, such as a parallel processing unit (PPU), an accelerator (e.g., a deep learning accelerator), a data processing unit (DPU), and/or the like. GPU 150 may include multiple GPU cores 160 capable of executing separate threads of instructions in parallel. In some embodiments, the number of GPU cores 160 may be as low as two or as large as several hundred (or even more). In some embodiments, GPU cores 160 may be separate physical processing cores, e.g., separate physical units manufactured on a single die or separate dies. Any or all GPU cores 160 may have a separate cache (e.g., level-1 cache) and may further share additional cache (e.g., level-2 cache) among multiple GPU cores 160. Similarly, CPU 130 may be a multi-core CPU. In some embodiments, at least some of the CPU cores may be virtual processor cores with a single physical CPU core supporting operations of multiple virtual processor cores.

Execution of operations of application 110 on CPU 130 and/or GPU 150 may be facilitated by an application programming interface (API) 120. API 120 may define and implement a set of functions and procedures that application 110 may implement on CPU 130 and/or GPU 150. API 120 may operate in conjunction with a GPU driver 140 of GPU 150. Execution of operations of application 110 on GPU 150 may be facilitated by a GPU driver 140, which may include a low-level software code that converts functions and procedures defined by API 120 into low-level instructions that may be understood by GPU 150, e.g., instructions that define how data is input, processed, and output by GPU 150. API 120 may translate various operations of application 110 (as may be programmed by a coder, developer, and/or any user of application 110, e.g., using a high-level code) into instructions that may be understood by GPU driver 140.

Application 110 may instruct, via one or more API calls 122, CPU 130 to execute multiple DFs 132-1, 132-2 . . . 132-N. Different DFs 132-*n* may perform any tasks defined by or associated with application 110. At least some of DFs 132-*n* may be executed in parallel. For example, DF 132-1 may render a static background of a video frame, DF 132-2 may render a depiction of an animate object in the video frame, DF 132-3 (not shown in FIG. 1) may compute and/or motion of that animate object across multiple video frames, DF 132-N may generate a soundtrack for the video frames, and so on. In another example, DF 132-1 may perform neural computations for a first branch of a neural network while DF 132-2 may perform computations for a second branch (which may be parallel to the first branch) of the neural network.

In some embodiments, computer architecture 100 may support parallel execution of multiple DFs 132-*n* using the following example operations. Individual DFs 132-*n* may generate and output commands to GPU 150. GPU 150 may execute CPU commands using parallel GPU threads. Individual GPU threads may perform various processing operations on input data to generate an output data. In one non-limiting example, DF 132-1 (or a group of several DFs) may be computing and rendering a motion of a certain object in the foreground of a video stream. DF 132-1 may determine a location and orientation of the object at a time corresponding to a previous video frame. DF 132-1 may also identify a speed of the object, a rate of angular rotation of the object, and a time interval between the current video frame and the previous video frame. DF 132-1 may further identify and perform operations (e.g., based on mathematical equations characterizing a motion of the object) that compute the location and orientation of the object for the current video frame. Other DFs 132-*n* (and/or groups of DFs) may similarly perform any number of additional processing tasks, as may be specified by application 110.

Commands generated by DFs 132-*n* may be specified in terms of functions and procedures defined by API 120, which convert these commands to instructions in a format that is understood by GPU driver 140. GPU driver 140 then implements those instructions on GPU 150. Various GPU cores 160 may execute the instructions implementing different DFs 132-*n* concurrently, e.g., in parallel. Some DFs 132-*n* may be executed using a single GPU core 160. Some DFs 132-*n* may be executed using multiple GPU cores 160.

Output data generated by GPU 150 for individual DFs 132-*n* may be stored in respective accumulation buffers 170. In some embodiments, accumulation buffers 170 may be defined by GPU driver 140 for each DF separately, e.g., by defining starting and/or final memory addresses (or offsets) in a memory that is internal to GPU 150 (e.g., a fast-access cache). Once the GPU driver 140 determines that the execution of various DFs has concluded (e.g., that the last GPU thread has stopped execution), a merge function (MF) 142, e.g., implemented by GPU driver 140, may read the output data from accumulation buffers 170, merge (aggregate) the output data, and store the merged data 190 in one or more OBs 180.

After merged data 190 for various (e.g., all) DFs 132-*n* has been stored in OB 180, MF 142 may set an indicator (e.g., a flag) signaling that merged data 190 is available to any intended recipient of the data, e.g., application 110 and/or any other application. For example, merged data 190 may be displayed on a screen, compressed, transmitted over a network, filtered, enhanced, and/or used in any number of such or other operations. Merged data 190 may be used to render subsequent video frames that are based, at least in part, on the data generated for the current video frame. As another example, merged data 190 may represent an output of a particular layer of neurons of a deep neural network model and may be used for computation of outputs of subsequent layers of the neural network model.

In some embodiments, merged data 190 may be accessed by application 110 (and/or any other applications) directly in OB 180. In some embodiments, at least a portion of merged data 190 may be moved to a different memory device, e.g., system memory, a cache memory of a different processor (e.g., CPU 130 or any other processing unit), and the like. In some embodiments, OB 180 may be used as an input buffer for further processing of merged data 190 by CPU 130 and/or GPU 150.

Figure 2:
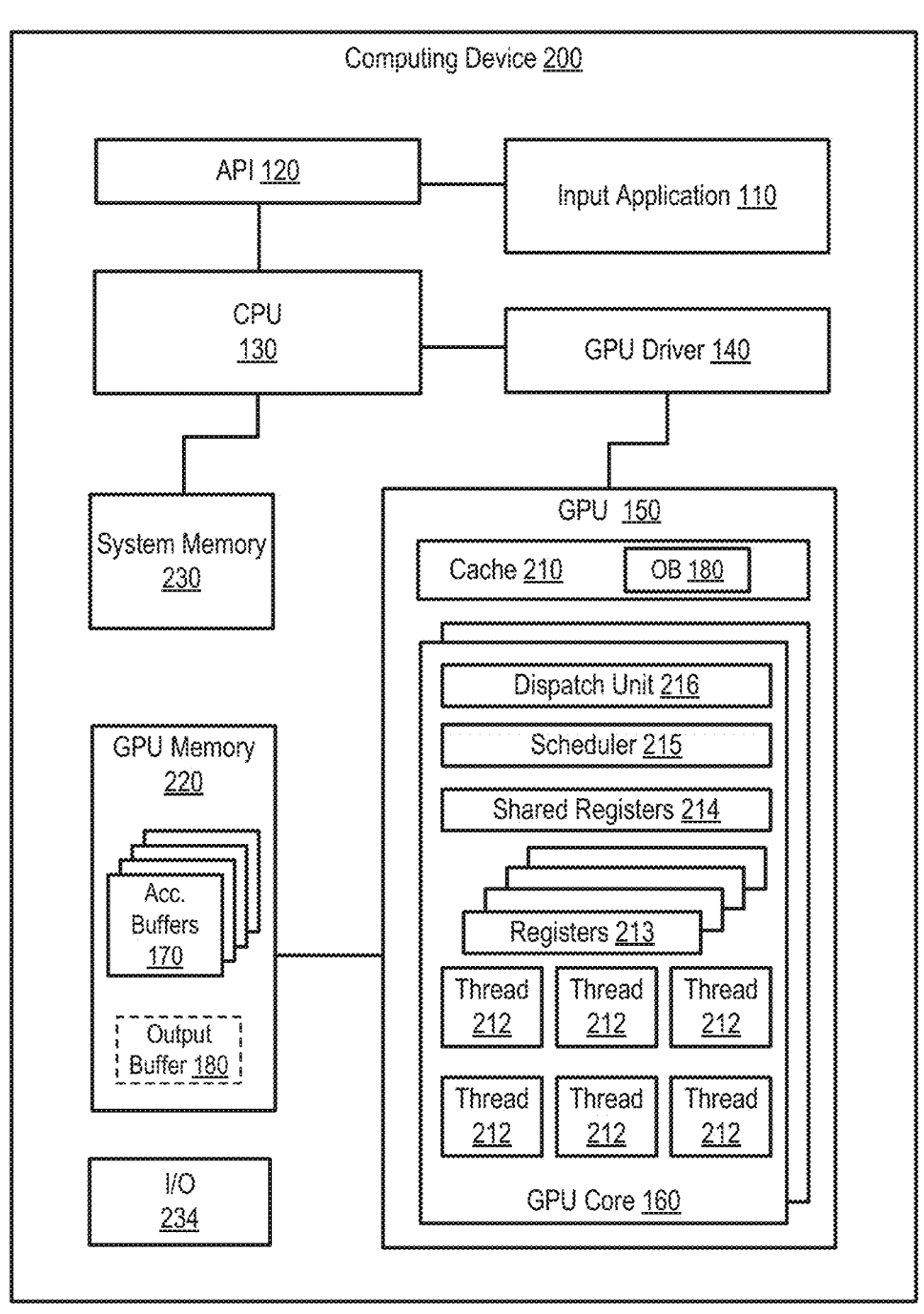
FIG. 2 illustrates an example computing device that deploys accumulation buffers for efficient parallel execution of multiple processing operations in real-time streaming and latency-sensitive applications, according to at least one embodiment.

FIG. 2 illustrates an example computing device 200 that deploys accumulation buffers for efficient parallel execution of multiple processing operations in real-time streaming and latency-sensitive applications, according to at least one embodiment. In at least one embodiment, computing device 200 may implement computing architecture 100 of FIG. 1. In at least one embodiment, computing device 200 may support one or more applications, e.g., application 110. In some embodiments, different applications may be directed to a common processing task or to a set of related processing tasks, e.g., one application 110 may be a video rendering application and another application 110 (not shown in FIG. 2) may be a network application that performs data compression, streaming, and/or decompression. In some embodiments, different applications may be unrelated to each other or even be from different fields of technology, e.g., one application 110 may be a gaming application and another application 110 may be a neural network application.

Execution of various applications on computing device 200 may be facilitated by one or more APIs 120. Application 110 may be executed using CPU 130, GPU 150, and/or some other processing units not depicted in FIG. 2 (e.g., PPUs, DPUs, accelerators, etc.), and/or using any combination thereof. API 120 may interface operations of application 110 with CPU 130 and/or GPU 150. In at least one embodiment, GPU 150 includes multiple cores 160, some or all cores 160 being capable of executing multiple threads 212. Some or all cores 160 may run multiple threads 212 concurrently (e.g., in parallel). In at least one embodiment, one or more threads 212 may have access to registers 213. Registers 213 may be thread-specific registers with access to a register restricted to a respective thread. Additionally, shared registers 214 may be accessed by one or more (e.g., all) threads of a specific core 160. In at least one embodiment, some or all cores 160 may include a scheduler 215 to distribute computational tasks and processes among different threads 212 of core 160. A dispatch unit 216 may implement scheduled tasks on appropriate threads using correct registers 213 and/or shared registers 214. Computing device 200 may include input/output component(s) 234 to facilitate exchange of information with one or more external devices.

In at least one embodiment, GPU 150 may have a (high-speed) cache 210, access to which may be shared by multiple (e.g., some or all) cores 160. Cache 210 may include one or more OBs 180. Furthermore, computing device 200 may include a GPU memory 220 where GPU 150 may store intermediate and/or final results (outputs) of various computations performed by GPU 150. After completion of a particular task, GPU 150 (or CPU 130) may move the output to system (main) memory 230. GPU memory 220 may include multiple accumulation buffers 170. In some embodiments, GPU memory 220 may include one or more OBs 180. In some embodiments, cache 210 may include one or more accumulation buffers 170 (not depicted in FIG. 2 for conciseness). In at least one embodiment, CPU 130 may execute processes that involve serial computational tasks whereas GPU 150 may execute tasks (such as multiplication of inputs of a neural node by weights, adding biases, etc.) that are amenable to parallel processing. In at least one embodiment, application 110 (or API 120) may determine which processes are to be executed on GPU 150 and which processes are to be executed on CPU 130. In other embodiments, CPU 130 may determine which processes are to be executed on GPU 150 and which processes are to be executed on CPU 130.

FIGS. 3A-D illustrate schematically deployment of accumulation buffers for execution of multiple processing operations in real-time streaming and latency-sensitive applications, according to at least one embodiment. For illustration, FIGS. 3A-D illustrate storage of output data generated for four DFs 132-1 . . . 132-4 by a GPU (or any other suitable processing device or a combination of processing devices), but it should be understood that any number of DFs 132-n may be supported in a similar manner. FIG. 3A illustrates how an out-of-order arrival of the output data may occur. For example, application 110 (via API 120) may assign portions of OB 180 to store corresponding outputs of various DFs 132-n, as depicted with dashed arrows in FIG. 3A. The assigned portions may be overlapping, indicating that the data stored in the respective portions ars to be merged (aggregated) using a suitable MF 142, MF(Output$_1$, Output$_2$ . . . ), where Output$_j$ is an output of some specific DF 132-n. The MF 142 may aggregate any number of outputs of various DF 132-n for at least some portions of the output data. The MF 142 may be sensitive to the order in which different DF outputs are aggregated, such that MF(Output$_1$, Output$_2$ . . . )$\neq$MF(Output$_2$, Output$_1$ . . . ). In one illustrative non-limiting example, different DF outputs may be weighted, $$MF(\text{Output}_1, \text{Output}_2 \ldots) = w_1 \times \text{Output}_1 + w_2 \times \text{Output}_2,$$

with weights $w_1$, $w_2$, etc., that are different for different outputs. If, during parallel execution of various DFs 132-n, the respective outputs Output$_j$ arrive at OB 180 in a wrong order, the merged data in OB 180 will be computed (merged) incorrectly (as depicted with the spotted regions of OB 180).

Figure 3B:
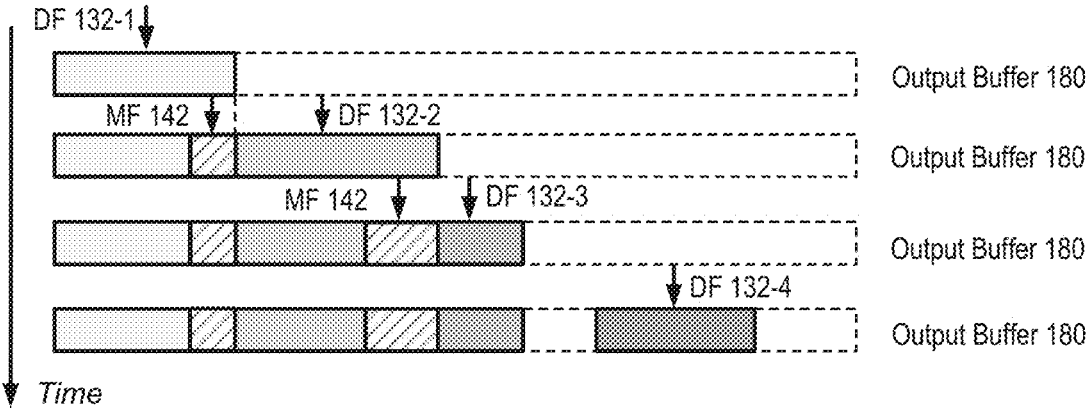

FIG. 3B illustrates maintaining a correct ordering of the output data using a conventional approach of executing different DFs 132-n sequentially. More specifically, API 120 and/or GPU driver 140 (as referenced in FIG. 1) may structure the interaction between CPU 130 and GPU 150 in such a way that the execution of jth DF 132-j begins after the execution of j–1th DFs 132-(j–1) has concluded and the respective output data is stored in OB 180. MF 142 may be applied to aggregate the output data during each data storage. For example, when the output data for DF 132-2 is ready, this output data may be merged with the output data generated previously for DF 132-1 and stored in OB 180. Similarly, when the output data for DF 132-3 is ready, that data can be merged with the output data generated previously for DF 132-2 (and/or the DF 132-1 data and DF 132-2 data previously aggregated, if multiple sets of the output data are merged).

Figure 3C:
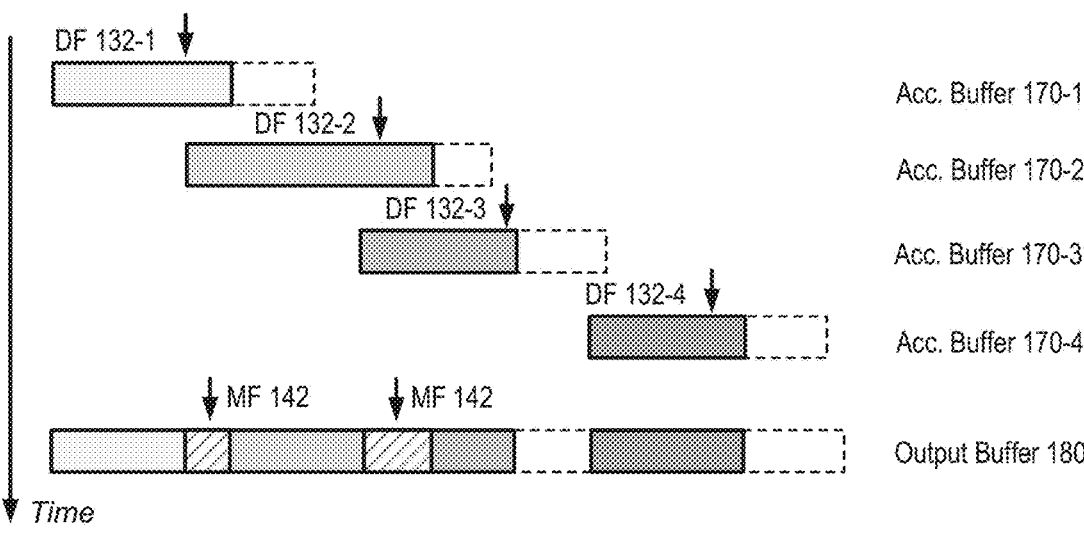

FIG. 3C illustrates the use of accumulation buffers for fast parallel execution of multiple processing operations. As illustrated, GPU driver 140 (and/or API 120) may establish a set of accumulation buffers 170-1 . . . 170-4, each accumulation buffer assigned to a respective DF 132-1 . . . 132-4. Various DFs 132-n may be executed in parallel on GPU 150 (or some other processing device capable of parallel processing) with the outputs of the DFs 132-1, 132-2 . . . stored in respective accumulation buffers 170-1, 170-2, etc. Upon completion of the processing of the last DF (which may be any of DFs 132-1, 132-2, etc., depending on the volume of computations performed for each DF 132-n), GPU 150 (or other processing device) may copy, move, or otherwise transfer or relocate the output data stored in various accumulation buffers 170-n to OB 180. In the course of data relocation, GPU 150 can execute MF 142 to merge individual DF outputs.

Figure 3D:
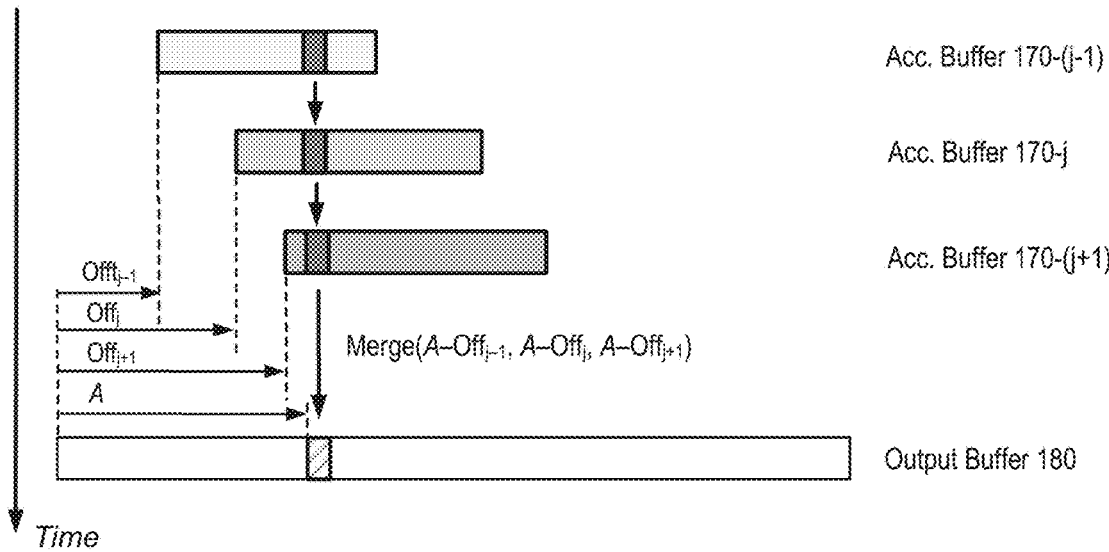

In some embodiments, merging of individual DF outputs can be performed as illustrated in FIG. 3D. Individual accumulation buffers 170-n may be defined (e.g., in GPU memory 220) by identifying a starting offset Off$_n$ relative to the starting address of OB 180. To generate a unit of merged data that is to be stored at address A of OB 180, GPU 150 can apply MF 142 to the data units stored in different accumulation buffers 170-n whose addresses match (in view of the respective offsets) the address A of OB 180. More specifically, in a situation illustrated in FIG. 3D, where address A matches addresses of threes units of output data stored in three accumulation buffers 170-(j–1), 170-j, and 170-(j+1), MF 142 can be applied to the data in the respective units, Merge(A–Off$_{j-1}$, A–Off$_j$, A–Off$_{j+1}$). The value computed using MF 142 is then stored at address A of OB 180. Since each unit of data is retrieved from a dedicated accumulator buffer 170-n, the inputs into MF 142 may be correctly ordered regardless of an order in which output of different DFs 132-n are stored in respective accumulation buffers 170-n.

The accumulation buffers 170-n may be established by GPU driver 140, e.g., alone or in coordination with API 120, in any suitable memory device. For example, for increased speed of memory storage and relocation, the accumulation buffers 170-n may be located in a memory that is internal to the processor, e.g., GPU memory 220 or cache 210 (as illustrated in FIG. 2). In some embodiments, various accumulation buffers 170-n may have custom sizes that are set based on the sizes of the maximum expected outputs of the respective DFs 132-n. In one illustrative example, during initialization of the application 110 (e.g., on computing device 200), application 110 may communicate, via API 120, the expected sizes Size$_n$ of the outputs of different DFs 132-n to GPU driver 140. In response, GPU driver 140 may allocate, to each DF 132-n, a range of memory addresses [Start$_n$, Start$_n$+Size$_n$] in GPU memory 220 starting from a suitably chosen address Start$_n$. In some embodiments, different accumulation buffers 170-n may have the same size Size$_n$. In some embodiments, different accumulation buffers 170-n may have custom (unequal) sizes Size$_n$.

It should be understood that the embodiment described in conjunction with FIGS. 3C-D and deploying a single OB 180 is intended as an illustration and that multiple OBs 180 may be used to support various DFs 132-n. For example, if each of S application processes, DF 132-1 . . . DF 132-S causes the output data generated by GPU 150 (or some other parallel processing device) to be stored in M output buffers 180, GPU driver 140 may deploy S×M accumulation buffers 170-n, e.g., with each group of S accumulation buffers 170 channeling data (e.g., after aggregation) into a respective one of M output buffers 180.

Figure 4A:
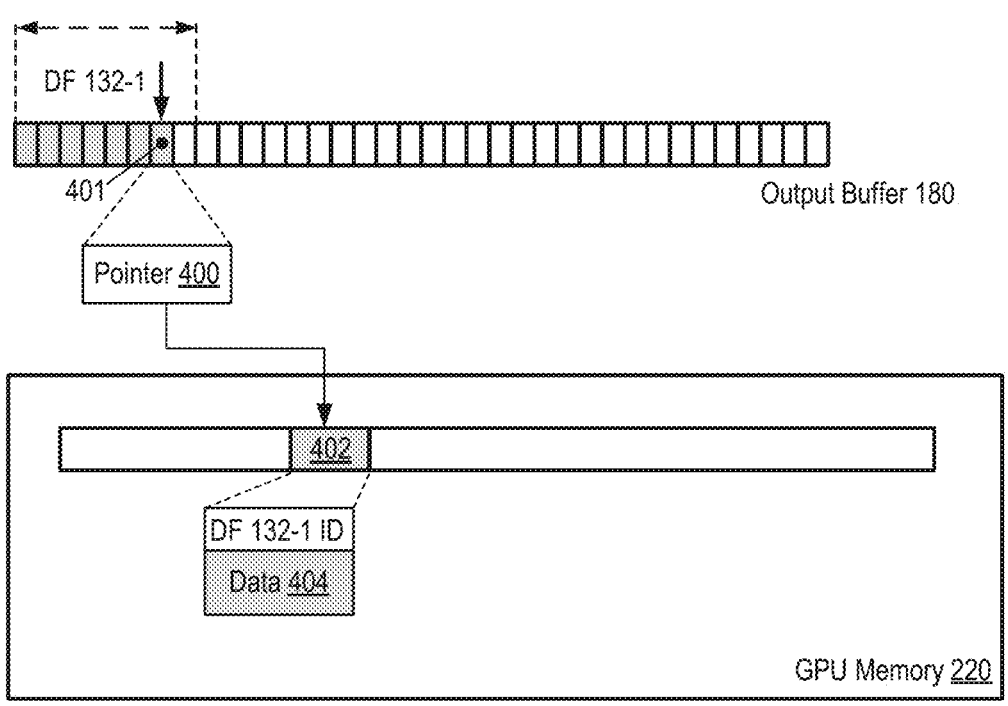
FIGS. 4A-4B illustrate schematically deployment of pointers and linked nodes for efficient execution of multiple processing operations in real-time streaming and latency-sensitive applications, according to at least one embodiment.
Figure 4B:
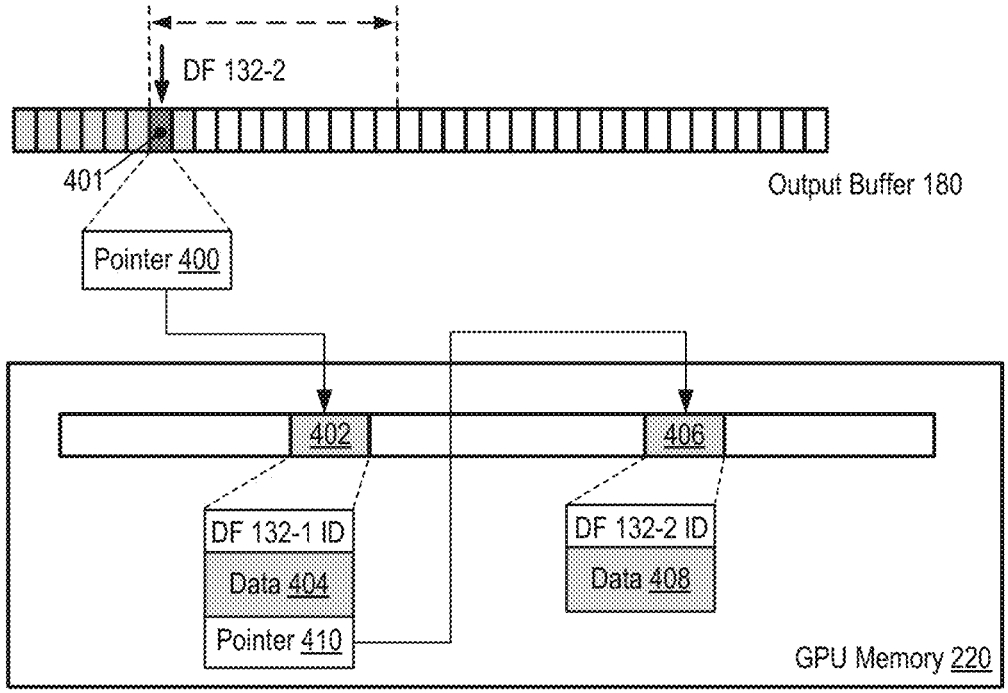

FIGS. 4A-B illustrate schematically deployment of pointers and linked nodes for efficient execution of multiple processing operations in real-time streaming and latency-sensitive applications, according to at least one embodiment. As illustrated in FIG. 4A, OB 180 may include a number of cells (indicated with small rectangles), individual cells having separate OB addresses and storing pointers to various addresses of GPU memory 220 (or any other suitable memory device, e.g., system memory 230). The cells may store 8-bit pointers, 16-bit pointers, or pointers of any other size, as may be defined by the GPU driver 140, in one example. Initially, e.g., at the initialization of application 110, the cells may be empty or may store null pointers.

GPU 150 (or some other processing device capable of parallel processing) may execute operations associated with various DFs 132-$n$ in parallel and store the output data using pointers placed in the corresponding cells of OB 180. For example, a first unit of output data 404 (e.g., a 4 KB unit of data or a unit of data of any other size) generated for DF 132-1 (or any other DF) may be scheduled to be stored in a cell 401 of OB 180. As illustrated in FIG. 4A, instead of storing the first unit of output data 404 in cell 401, GPU 150 may store the first unit of output data 404 in any free memory address of GPU memory 220, e.g., the next available memory address 402 of GPU memory 220 or a random memory address 402 taken from a heap of available memory addresses. Additionally, memory address 402 may store an identification (ID) of the DF that is responsible for the first unit of output data 404 (e.g., ID of DF 132-1). A pointer 400 to memory address 402 may be stored in cell 401 of OB 180.

As further illustrated in FIG. 4B, a second unit of output data 408 generated for DF 132-2 (or any other DF) may also be scheduled to be stored in the same cell 401 of OB 180. Since pointer 400 has previously been placed in cell 401, GPU driver 140 may follow pointer 400 to the memory address 402 indicated by pointer 400 and may place a secondary pointer 410 that points to a new memory address 406 (which may be any free memory address of GPU memory 220, including a random address). Memory address 406 may be used to store the second unit of output data 408 together with an identification of the DF that is responsible for the second unit of output data 408 (e.g., ID of DF 132-2, in this example). Similarly, each subsequent unit of the output data generated for any other DF may be placed in a node (unit of GPU memory 220) that is linked, by a pointer, to a node with a previously stored unit of the output data. Correspondingly, each linked sequence of nodes starts from a cell in OB 180 and includes nodes that store units of the output data generated in the chronological order, ending with the output data that was generated last.

During data aggregation, MF 142 may traverse each linked sequence of nodes and identify all units of the output data associated with a respective cell of OB 180, including identifications of various DFs that are responsible for the corresponding units of the output data. MF 142 may then apply the aggregation function Merge(·) to the correctly ordered units of the output data.

FIGS. 5-6 are flow diagrams of example methods 500-600 of efficient storage of outputs of multiple processing operations during parallel execution of live streaming and/or time-sensitive applications, according to some embodiments of the present disclosure. Methods 500-600 may be executed using graphics processing units and/or other processing units capable of parallel processing (e.g., CPUs, accelerators, PPUs, DPUs, etc.). Methods 500-600 may be performed in the context of video gaming applications, live-streaming applications, autonomous driving applications, industrial control applications, computer-vision services, artificial intelligence and machine learning services, mapping services, virtual reality or augmented reality services, and many other contexts, and/or other contexts. In at least one embodiment, methods 500-600 may be performed using computing architecture 100 of FIG. 1, computing device 200 of FIG. 2, and/or other similar computing architectures and devices. In at least one embodiment, processing units performing any of methods 500-600 may be executing instructions stored on a non-transient computer-readable storage media. In at least one embodiment, any of methods 500-600 may be performed using multiple processing threads (e.g., GPU threads and/or CPU threads), individual threads executing one or more individual functions, routines, subroutines, or operations of the methods. In at least one embodiment, processing threads implementing any of methods 500-600 may be synchronized (e.g., using semaphores, critical sections, and/or other thread synchronization mechanisms). Alternatively, processing threads implementing any of methods 500-600 may be executed asynchronously with respect to each other. Various operations of any of method 500 and/or 600 may be performed in a different order compared with the order shown in FIGS. 5-6. Some operations of methods 500-600 may be performed concurrently with other operations. In at least one embodiment, one or more operations shown in FIGS. 5-6 may not always be performed.

FIG. 5 is a flow diagram of an example method 500 of deployment of accumulation buffers for efficient execution of multiple processing operations in real-time streaming and latency-sensitive applications, according to at least one embodiment. At block 510, method 500 may include executing, using a GPU (or some other processing unit), a first set of one or more GPU threads to generate a first data associated with a destination address of an output buffer. For example, the destination address may include an address where the first data is intended to be stored. The output buffer may be in any suitable memory device, e.g., one of GPU registers, cache, and/or internal GPU memory. In some embodiments, the output buffer may be defined using one or more programming functions and/or features, such as Unordered Access View (UAV), Render Target View (RTV), and/or any other functions that may be executed on a GPU and/or other processing units. At block 520, method 500 may include executing, using the GPU, a second set of one or more GPU threads (third set of GPU threads, etc.) to generate the second (third, etc.) data associated with the destination address of the output buffer. The second (third, etc.) set of GPU threads may be executed concurrently (e.g., in parallel) with the first set of GPU threads. In some embodiments, the sets of GPU threads may implement shaders and/or other suitable image processing routines. In some embodiments, the first set of GPU threads may be caused (or initiated) by a first dispatch function (DF) executed and/or scheduled by a CPU and the second (third, etc.) set of GPU threads may be caused (or initiated) by a second (third, etc.) DF executed and/or scheduled by the CPU. In some embodiments, the first DF and the second (third, etc.) DF may be scheduled by the CPU in response to receiving one or more calls from an application programming interface (API) of an application. In some embodiments, the application may be (or include) a multimedia application, including but not limited to a Microsoft DirectX® multimedia application. In some embodiments, the first application may include a gaming application, a video streaming application, an artificial intelligence application, a Compute Unified Device Architecture (CUDA®) application, a computational application, and OpenCL application, a DirectXCompute application, and/or any other suitable application.

At block 530, method 500 may continue with storing the first data in a first accumulation buffer. At block 540, method 500 may include storing the second data in a second accumulation buffer. In some embodiments, the first (second) accumulation buffer may be defined by associating a first (second) address offset in a memory internal to the GPU with the first (second) set of GPU threads. In some embodiments, the first accumulation buffer and the second accumulation buffer may be defined (in the memory internal to the GPU) by at least one of a GPU driver or an API of the first application. In some embodiments, a size of the first accumulation buffer and/or the second accumulation buffer may be defined during initialization of the application using an estimated size (e.g., the maximum estimated size) of the first (second, etc.) data. In some embodiments, the first accumulation buffer and the second (third, etc.) accumulation buffer may have the same size.

At block 550, method 500 may continue with the GPU (or CPU) applying an aggregation function (e.g., a suitably chosen merge (aggregation) function MF(·), as described in conjunction with FIGS. 3B-3D) to the first data and the second data to generate an aggregated data (e.g., merged data 190). In some embodiments, an output of the aggregation function may depend on an order of the first data and the second data. In some embodiments, applying the aggregation function to the first data and/or the second (third, etc.) data is performed responsive to completion of both the first set of GPU threads and the second set of GPU threads. At block 560, method 500 may include storing the aggregated data at the destination address of the output buffer.

Although method 500 is illustrated in conjunction with an example in which multiple sets of GPU threads are associated with a single application, similar techniques may be used to process, aggregate, and store outputs of GPU threads associated with different applications (e.g., with two or more applications).

FIG. 6 is a flow diagram of an example method 600 of deployment of pointers and linked nodes for efficient execution of multiple processing operations in real-time streaming and latency-sensitive applications, according to at least one embodiment. Method 600 may include generating, at block 610, a first unit of data. The first unit of data may be generated in the course of execution of a first set of GPU threads on a GPU (or in the course of thread execution on some other processing unit capable of parallel processing of multiple threads). At block 620, method 600 may continue with storing the first unit of data at a first location of the GPU memory. At block 630, method 600 may include storing, in an OB of the GPU, a first pointer to the first location in the GPU memory. At block 640, method 600 may continue with generating a second unit of data. The second unit of data may be generated in the course of execution of a second (third, etc.) set of GPU threads. At block 650, method 600 may continue with storing the second (third, etc.) unit of data at a second location of the GPU memory. At block 660, method 600 may include storing, in the first location of the GPU memory, a second pointer to the second location in the GPU memory.

Figure 7:
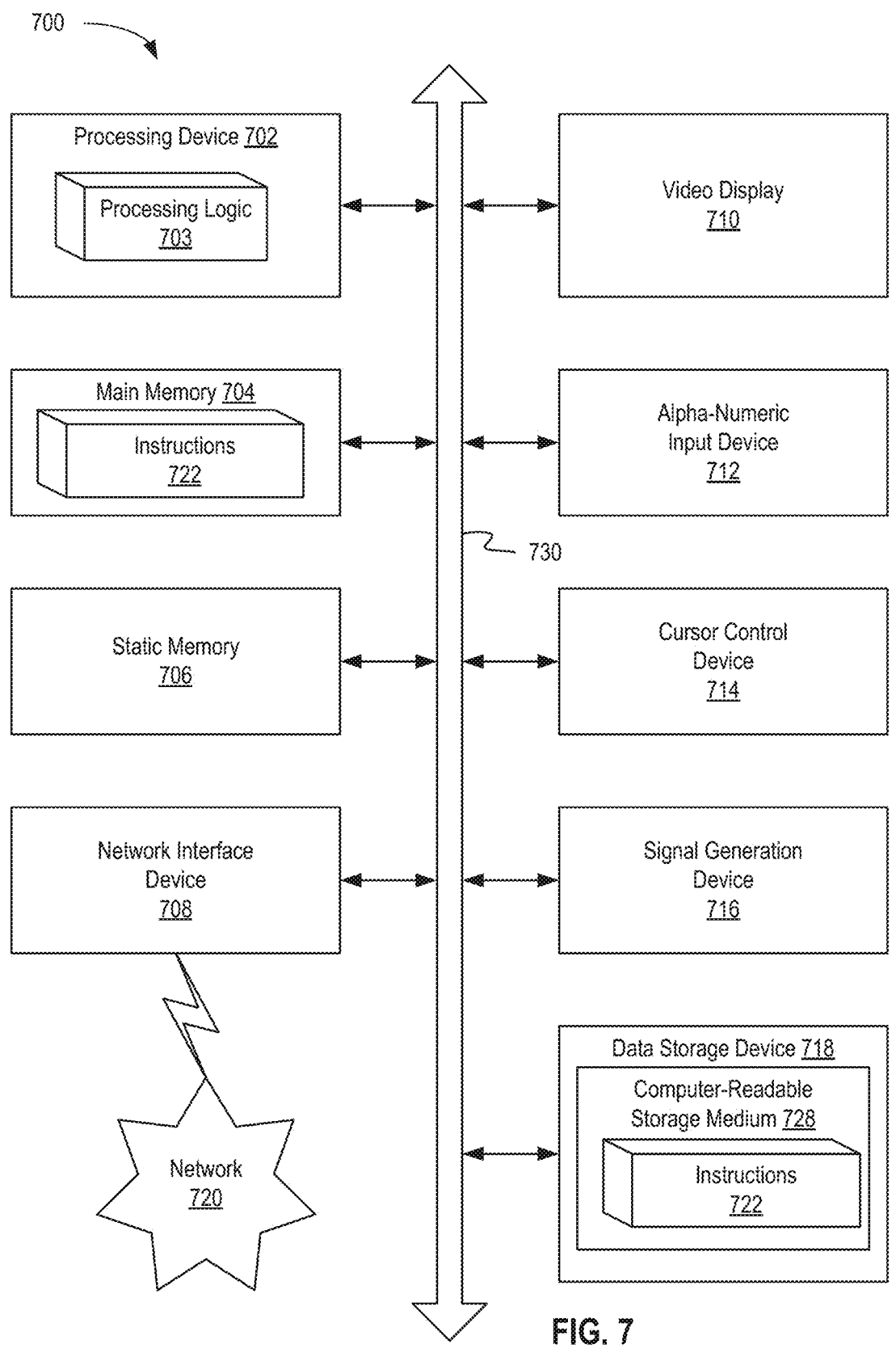
FIG. 7 depicts a block diagram of an example computer device capable of implementing efficient execution of multiple processing operations in real-time streaming and latency-sensitive applications, according to at least one embodiment.

FIG. 7 depicts a block diagram of an example computer device 700 capable of implementing efficient execution of multiple processing operations in real-time streaming and latency-sensitive applications, according to at least one embodiment. Example computer device 700 can be connected to other computer devices in a LAN, an intranet, an extranet, and/or the Internet. Computer device 700 can operate in the capacity of a server in a client-server network environment. Computer device 700 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" shall also be taken to include any collection of computers that individually or jointly execute a set (or multiple sets) of instructions to perform any one or more of the methods discussed herein.

Example computer device 700 can include a processing device 702 (also referred to as a processor or CPU), a main memory 704 (e.g., read-only memory (ROM), flash memory, dynamic random access memory (DRAM) such as synchronous DRAM (SDRAM), etc.), a static memory 706 (e.g., flash memory, static random access memory (SRAM), etc.), and a secondary memory (e.g., a data storage device 718), which can communicate with each other via a bus 730.

Processing device 702 (which can include processing logic 703) represents one or more general-purpose processing devices such as a microprocessor, central processing unit, or the like. More particularly, processing device 702 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. In accordance with one or more aspects of the present disclosure, processing device 702 can be configured to execute instructions executing method 500 of deployment of accumulation buffers and method 600 of deployment of pointers and linked nodes for efficient execution of multiple processing operations in real-time streaming and latency-sensitive applications.

Example computer device 700 can further comprise a network interface device 708, which can be communicatively coupled to a network 720. Example computer device 700 can further comprise a video display 710 (e.g., a liquid crystal display (LCD), a touch screen, or a cathode ray tube (CRT)), an alphanumeric input device 712 (e.g., a keyboard), a cursor control device 714 (e.g., a mouse), and an acoustic signal generation device 716 (e.g., a speaker).

Data storage device 718 can include a computer-readable storage medium (or, more specifically, a non-transitory computer-readable storage medium) 728 on which is stored one or more sets of executable instructions 722. In accordance with one or more aspects of the present disclosure, executable instructions 722 can comprise executable instructions executing method 500 of deployment of accumulation buffers and method 600 of deployment of pointers and linked nodes for efficient execution of multiple processing operations in real-time streaming and latency-sensitive applications.

Executable instructions 722 can also reside, completely or at least partially, within main memory 704 and/or within processing device 702 during execution thereof by example computer device 700, main memory 704 and processing device 702 also constituting computer-readable storage media. Executable instructions 722 can further be transmitted or received over a network via network interface device 708.

While the computer-readable storage medium 728 is shown in FIG. 7 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems can be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

Other variations are within the spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example embodiments of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:
executing, using a graphics processing unit (GPU), a first set of GPU threads to generate first data for an application, wherein the first data is associated with a destination address of an output buffer;
executing, using the GPU, a second set of GPU threads to generate second data for the application, wherein the second data is associated with the destination address of the output buffer, and wherein the second set of GPU threads is executed concurrently with the first set of GPU threads;
storing the first data in a first accumulation buffer;
storing the second data in a second accumulation buffer, wherein the first accumulation buffer and the second accumulation buffer are defined, in a memory internal to the GPU, using at least one of a GPU driver or an application programming interface (API) of the application;
applying an aggregation function to the first data and the second data to generate an aggregated data; and
storing the aggregated data at the destination address of the output buffer.

2. The method of claim 1, wherein the application comprises at least one of a multimedia application, a gaming application, a video streaming application, an artificial intelligence application, or a computational application.

3. The method of claim 1, wherein an output of the aggregation function depends on an order of the first data and the second data.

4. The method of claim 1, wherein the first accumulation buffer is defined by associating a first address offset in the memory internal to the GPU with the first set of GPU threads, and the second accumulation buffer is defined by associating a second address offset in the memory internal to the GPU with the second set of GPU threads.

5. The method of claim 1, wherein a size of the first accumulation buffer is defined during initialization of the application using an estimated size of the first data.

6. The method of claim 1, wherein the first accumulation buffer and the second accumulation buffer have a same size.

7. The method of claim 1, wherein executing the first set of GPU threads is caused by a first dispatch function (DF) and executing the second set of GPU threads is caused by a second DF, wherein the first DF and the second DF are scheduled by a central processing unit (CPU) in response to receiving one or more calls from an application programming interface (API) of the application.

8. The method of claim 1, wherein applying the aggregation function to the first data and the second data is responsive to completing an execution of both the first set of GPU threads and the second set of GPU threads.

9. A system comprising:
a memory device;
a central processing unit (CPU) configured to:

receive one or more calls from an application programming interface (API) of an application; and
in response to the one or more calls from the API, schedule execution of a first set of threads and a second set of threads; and
a graphics processing unit (GPU) communicatively coupled to the memory device and to the CPU, the GPU configured to:
execute the first set of threads to generate first data for the application, wherein the first data is associated with a destination address in an output buffer of the memory device;
execute the second set of threads to generate second data for the application, wherein the second data is associated with the destination address in the output buffer of the memory device, and wherein the second set of threads is executed concurrently with the first set of threads;
store the first data in a first accumulation buffer of the memory device;
store the second data in a second accumulation buffer of the memory device, wherein the first accumulation buffer and the second accumulation buffer are defined, in a memory internal to the GPU, using at least one of a GPU driver or the API of the application;
apply an aggregation function to the first data and the second data to generate an aggregated data; and
store the aggregated data at the destination address in the output buffer of the memory device.

10. The system of claim 9, wherein the application comprises at least one of a multimedia application, a gaming application, a video streaming application, an artificial intelligence application, or a computational application.

11. The system of claim 9, wherein an output of the aggregation function depends on an order of the first data and the second data.

12. The system of claim 9, wherein a size of the first accumulation buffer is defined during initialization of the application using an estimated size of the first data.

13. A parallel processor comprising:
one or more memory buffers; and
a graphics processing unit (GPU) communicatively coupled to the one or more memory buffers, the GPU comprising one or more processing cores configured to:
execute a first set of one or more GPU threads to generate first data for an application, wherein the first data is associated with a destination address in an output buffer of the one or more memory buffers;
execute a second set of one or more GPU threads to generate second data for the application, wherein the second data is associated with the destination address in the output buffer, and wherein the second set of GPU threads is executed concurrently with the first set of GPU threads;
store the first data in a first accumulation buffer of the one or more memory buffers;
store the second data in a second accumulation buffer of the one or more memory buffers, wherein the first accumulation buffer and the second accumulation buffer are defined, in a memory internal to the GPU, using at least one of a GPU driver or an application programming interface (API) of the application;
apply an aggregation function to the first data and the second data to generate an aggregated data; and
store the aggregated data at the destination address in the output buffer.

14. The parallel processor of claim 13, wherein the application comprises at least one of a multimedia application, a gaming application, a video streaming application, an artificial intelligence application, or a computational application.

15. The parallel processor of claim 13, wherein an output of the aggregation function depends on an order of the first data and the second data.

16. The parallel processor of claim 13, wherein a size of the first accumulation buffer is defined during initialization of the application using an estimated size of the first data.

17. The parallel processor of claim 13, wherein the aggregation function is applied to the first data and the second data responsive to completion of both the first set of GPU threads and the second set of GPU threads.

18. The parallel processor of claim 13, wherein the parallel processor is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system for generating or presenting at least one of augmented reality content, virtual reality content, or mixed reality content;

a system implemented using a robot;

a system for performing conversational artificial intelligence (AI) operations;

a system for generating synthetic data;

a system incorporating one or more virtual machines (VMs);

a system implemented at least partially in a data center; or a system implemented at least partially using cloud computing resources.

* * * * *